United States Patent Office 3,201,467
Patented Aug. 17, 1965

3,201,467
PROPARGYLABIETYLAMINES
Billy D. Oakes, Midland, Mich., assignor to The Dow Chemical Company, Midland, Mich., a corporation of Delaware
No Drawing. Filed May 7, 1962, Ser. No. 192,973
8 Claims. (Cl. 260—563)

This invention relates to new compounds which are useful as corrosion inhibitors, to aqueous acids inhibited with said compounds, and to processes for making said compounds and for inhibiting the corrosion of metals exposed to aqueous acids.

The corrosion inhibitors of the invention are secondary or tertiary amines or quaternary ammonium bases or salts of such amines or ammonium bases, wherein there is at least one propargyl or 3-hydroxymethylpropargyl (4-hydroxy-2-butynyl) radical and at least one abietyl-type radical. By abietyl-type radical is meant radicals such as abietyl, dehydroabietyl, dihydroabietyl, tetrahydroabietyl and the like. Thus, the new inhibitors can be represented by the generic formula

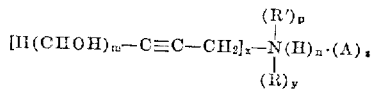

wherein R represents an abietyl-type radical, R' represents an aliphatic hydrocarbon radical containing from 1 to about 20 carbon atoms, preferably alkyl or alkenyl, A represents an anion and $m$, $n$, $p$, $x$, $y$ and $z$ represent integers, $m$ and $z$ each being 0 to 1, $n$ and $p$ each being 0 to 2, and $x$ and $y$ each being 1 to 3, the values of $n$, $p$, $x$, $y$ and $z$ being chosen such that they satisfy the equation $n+p+x+y-z=3$.

The anion A in the above formula is ordinarily a halide ion, usually Cl⁻ or Br⁻, derived either from the corresponding acid HA or from an organic ester of such acid. Thus, in making the amine, a reactant such as RA or HOCH$_2$C≡CCH$_2$A may be condensed with an appropriate amine to produce the final product. Since when the inhibitor is added to aqueous acid the anion A, if different from the anion of the aqueous acid, will be largely or completely displaced by the latter, it is apparent that the identity of A is of no real significance. As a matter of convenience it is ordinarily chloride, bromide, sulfate, phosphate, acetate or the like. It is absent, of course, in the free amines. When the amines are mixed with aqueous acids they form the corresponding salt with the acid.

The new amines and quaternary ammonia compounds can be conveniently made by the condensation of a propargyl halide or a 3-hydroxymethylpropargyl halide with an abietyl-type amine. If the amine is a secondary or tertiary amine, the substituents on the nitrogen may all be abietyl-type or one may be aliphatic hydrocarbon and the others abietyl-type. Alternatively, the new amines may be made by the condensation of a propargyl-type primary or secondary amine with an abietyl-type halide. By propargyl-type amine is meant an amine containing at least one propargyl or 3-hydroxymethylpropargyl radical. Still another method for making the new amines is to condense ammonia or a primary or secondary alkylamine successively with a propargyl-type halide and an abietyl-type halide. All the foregoing amine-halide condensations can be effected by simply mixing the reactants and preferably, applying mild heat. Suitable temperatures are from room temperature to about 150° C. When more than one mole of halide is to be condensed with ammonia or an amine it is necessary to use an equivalent of a base, such as alkali metal hydroxide or carbonate, to neutralize the hydrohalide acid that is produced. All the intermediates required in the above processes are known or can be made by obvious modifications of the methods used to make known analogous compounds.

The preparation of a typical compound of the invention is illustrated by the following example. The others were made by the substitution of the appropriate reactants in the same general procedure.

EXAMPLE 1

*Preparation of N,N-dipropargylabietylamine*

A suitable reactor was charged with 236.7 g. (300 ml.) of absolute ethanol, 72.8 g. (0.25 m.) of abietylamine and 50 g. (0.60 m.) of sodium bicarbonate. While the mixture was heated at reflux, 59.3 g. (0.50 m.) of propargyl bromide was slowly added over a period of 1 hour. Reflux was continued for an additional 3 hours, after which the reaction mixture was cooled and filtered. The filtrate was poured into one liter of water, whereupon the desired product separated as a lower oily layer. This was separated and dried to yield 67 g. of an oil identified by infra-red spectrum as N,N-dipropargylabietylamine.

The free amines of the invention are viscous liquids, substantially insoluble in water but readily soluble in many organic solvents. The amine salts and the quaternary ammonium salts are more or less crystalline solids which are soluble or self-dispersing in water, at least in the low concentrations in which they are ordinarily used as corrosion inhibitors.

While the compounds of the invention are excellent corrosion inhibitors for aqueous acids, it has been discovered that their effectiveness is markedly improved by the presence of a conventional surfactant. The nature of the surfactant is not important. It may be anionic, cationic or non-ionic. The non-ionics are usually somewhat more effective, however, and are generally preferred.

Since the amines of the invention are typically very viscous, sticky liquids, the handling and measuring of the materials is greatly facilitated by the addition thereto of a minor amount of an organic diluent. Thus, the addition of 1 volume of isopropyl alcohol to 8 volumes of one of the compounds of the invention produces an enormous reduction in the viscosity of the latter and renders it readily pourable, even at temperatures as low as 18° F. The alcohol produces no appreciable effect on the corrosion inhibition of the compound. Other suitable diluents include lower alkanols, ketones, ethers and hydrocarbons.

In evaluating the new compounds as corrosion inhibitors for aqueous acid they were added to 15% aqueous hydrochloric acid and the corrosiveness of the acid on AISI 1010 mild steel determined. In these tests, a coupon of the metal measuring 1" x 2.75" x 0.12" was placed in a flask with 150 ml. of 15% aqueous hydrochloric acid and the flask was held at a constant temperature for 16 hours, after which the coupon was rinsed, dried and weighed to determine the weight loss due to corrosion. This was then calculated as lbs. per sq. ft. per day. The results of a series of such tests are shown in Table I. Examples 5 and 6 in the table show the relative ineffectiveness of propargylamine and abietylamine, respectively, these being compounds not included in the present invention.

TABLE I

| Example | Inhibitor (percent by volume) | Temp., °F. | Corrosion rate, lb./sq. ft./day |
|---|---|---|---|
| 2 | N,N-Dipropargylabietylamine (0.4). | 200 | 0.020 |
| 3 | N,N,N-Tripropargylabietylammonium bromide (0.4). | 200 | .025 |
| 4 | N,N-bis(3-hydroxymethylpropargyl)-dehydroabietylamine (0.4). | 200 | .030 |
| 5 | Propargylamine | 150 | >1 |
| 6 | Abietylamine (0.5) | 200 | .27 |

The examples in Table II show the improvement in corrosion inhibition that is produced by the inclusion of a surfactant. In these tests the procedure was the same as for Examples 2–6 except that all tests were run at 200° F. and with 0.3% by volume of N,N-dipropargylabietylamine as the inhibitor. Surfactant concentration was 0.2% by volume.

TABLE II

| Ex. No. | Surfactant | Corrosion Rate, lb./sq. ft./day |
|---|---|---|
| 7 | None | 0.055 |
| 8 | Nonylphenol condensed with 15 moles of ethylene oxide. | .011 |
| 9 | Ammonium isopropylbenzenesulfonate | .045 |
| 10 | Fatty alkyl quaternary ammonium chloride | .042 |

In a preferred embodiment of the invention it was found that the ability of the compounds of the invention to inhibit the corrosion of metal exposed to aqueous acids is markedly and unexpectedly increased by the addition thereto of a minor proportion of a 2-alkyn-1-ol containing 3 to 6 carbon atoms. This improvement is especially valuable in the protection of easily corrodable metals and/or the inhibition of acids at high temperatures; i.e., where corrosion conditions are especially severe. This feature is illustrated by the data in Table III. The tests there recorded were run in the same way as those in the preceding tables except that the metal sample was a 1-inch wide quarter-segment of 2.375-inch O.D. API N80 steel tubing, the temperature was 200° F. and the inhibitor, in addition to the alkynol, consisted of a mixture of 8 volumes of N,N-dipropargylabietylamine, 4 volumes of a surfactant made by condensing nonylphenol with 15 molar equivalents of ethylene oxide, and 1 volume of isopropyl alcohol. The percentages of inhibitor shown in the table are based on the mixture rather than on the pure amine and are referred to the volume of the aqueous acid.

TABLE III

| Ex. No. | Inhibitor, percent by volume | Alkynol, percent by volume | Corrosion Rate, lb./sq. ft./day |
|---|---|---|---|
| 11 | 0.8 | None | 1.0 |
| 12 | .72 | Propynol (0.08) | .076 |
| 13 | .72 | Hexynol (.08) | .042 |
| 14 | None | Propynol (0.8) | .23 |
| 15 | None | Hexynol (.8) | .10 |

The effect of concentration of inhibitor on the corrosion rate is shown by a series of experiments in which AISI 1010 steel coupons, 1″ x 2.75″ x 0.12″, were placed in 150 ml. of 15% hydrochloric acid and held at 200° F. for 16 hours, after which the weight loss was determined as in the above tests. Two inhibitor formulations were tested. In Series A the inhibitor was N,N-dipropargyl abietylamine while in Series B it was N,N-bis(3-hydroxy methylpropargyl)abietylamine. In both series the amine was mixed with a surfactant and isopropyl alcohol in the volume ratio of 8:4:1, as in Examples 11–13, the surfactant being the same as was used in Examples 8 and 11–13. Results of these tests are shown in the following table.

TABLE IV

| Ex. No. | Concentration of Inhibitor, percent by volume | Corrosion Rate, lb./sq. ft./day | |
|---|---|---|---|
| | | A | B |
| 16 | None | >1.0 | >1.0 |
| 17 | 0.4 | .011 | .013 |
| 18 | 0.3 | .010 | .027 |
| 19 | 0.1 | .032 | .052 |
| 20 | .05 | .26 | Not tested |

The inhibitors of the invention are effective in substantially any aqueous non-oxidizing acid. This is illustrated by the data in Table V. These tests were the same as Example 2 except that the acids were 5% aqueous solutions, the temperature was 150° F. and the inhibitor was the same 8:4:1 mixture used in Example 17A; i.e dipropargylabietylamine, oxyethylated nonylphenol and isopropyl alcohol. It was used in a total concentration of 0.4% by volume in these tests. In each case a blank was run (no inhibitor).

TABLE V

| Ex. No. | Acid | Inhibitor | Corrosion Rate, lb./sq. ft./day |
|---|---|---|---|
| 21 | Phosphoric | No | 0.10 |
| 22 | do | Yes | .004 |
| 23 | Sulfuric | No | .080 |
| 24 | do | Yes | .052 |
| 25 | Acetic | No | .014 |
| 26 | do | Yes | .004 |

The other compounds of the invention are effective corrosion inhibitors in aqueous non-oxidizing acids as is demonstrated by tests similar to those shown in the above examples. Among such compounds are N-propargyl-N-butylabietylamine,
N-(3-hydroxymethylpropargyl)-N-octadecylabietylamine,
N,N-dipropargyl-N-octylabietylammonium bromide,
N-propargyldiabietylamine,
N-(3-hydroxymethylpropargyl)-N-allyldihydroabietylamine,
N,N-dipropargyltetrahydroabietylamine,
N,N-dipropargyl-N-oleyldihydroabietylammonium phosphate,
N,N-bis(3-hydroxymethylpropargyl)-N,N-bis(dihydroabietyl)ammonium acetate,
N,N,N-tripropargyltetrahydroabietylammonium sulfate,
N-propargyl-N,N-bis(2-ethylhexyl)dehydroabietylammonium bromide and
N-propargyltriabietylammonium chloride.

I claim:
1. A compound having the formula

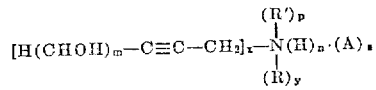

wherein R represents a radical selected from the group consisting of abietyl, dehydroabietyl, dihydroabietyl and tetrahydroabietyl radicals, R' represents an aliphatic hydrocarbon radical containing from 1 to about 20 carbon atoms, A represents an anion and m, n, p, x, y and z represent integers, m and z each being 0 to 1, x and y each being 1 to 3, $n$ and $p$ being 0 to 2, the values of $n$, $p$, $x$, $y$ and $z$ being such that they satisfy the equation $$n+p+x+y-z=3$$

2. A compound as defined in claim 1 wherein $z=0$.
3. A compound having the formula

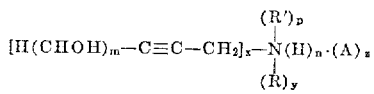

wherein R represents the abietyl radical, R' represents an aliphatic hydrocarbon radical containing from 1 to about 20 carbon atoms, A represents an anion and $m$, $n$, $p$, $x$, $y$ and $z$ represent integers, $m$ and $z$ each being 0 to 1, $x$ and $y$ each being 1 to 3, $n$ and $p$ being 0 to 2, the values of $n$, $p$, $x$, $y$ and $z$ being such that they satisfy the equation $$n+p+x+y-z=3$$

4. A compound as defined in claim 3 wherein $p$ is zero.

5. A compound as defined in claim 4 wherein $z=0$.
6. N,N-dipropargylabietylamine.
7. N,N,N-tripropargylabietylammonium bromide.
8. N,N - bis(3 - hydroxymethylpropargyl)dehydroabietylamine.

References Cited by the Examiner

UNITED STATES PATENTS

| 2,703,797 | 3/55 | Sanders | 260—563 |
| 2,766,285 | 10/56 | Hennion | 260—563 |
| 2,776,263 | 1/57 | Hiskey | 252—390 |
| 2,812,326 | 11/57 | De Rose | 260—563 X |

FOREIGN PATENTS 842,651   7/60   Great Britain.

CHARLES B. PARKER, *Primary Examiner.*

JOSEPH P. BRUST, *Examiner.*